May 9, 1933.  E. B. BOUGHTON ET AL  1,908,505
FLUID PRESSURE BRAKING SYSTEM
Filed Jan. 17, 1930
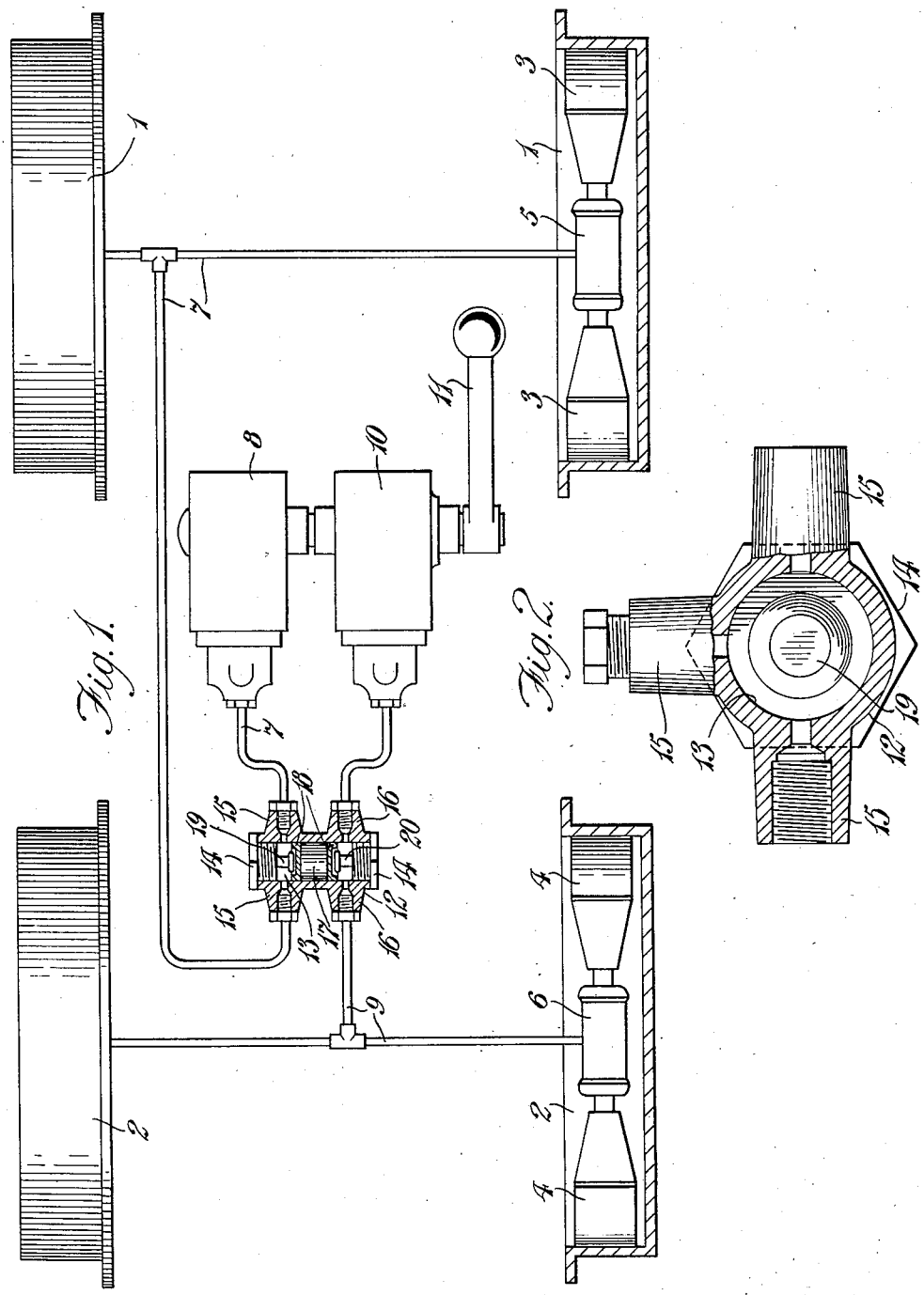
INVENTORS
E.B.BOUGHTON, W. EMMOTT and D.T. BROCK
by
ATTY.

Patented May 9, 1933

1,908,505

UNITED STATES PATENT OFFICE

EDWARD BISHOP BOUGHTON, WILLIE EMMOTT, AND DENIS TABOR BROCK, OF LONDON, ENGLAND

FLUID PRESSURE BRAKING SYSTEM

Application filed January 17, 1930, Serial No. 421,491, and in Great Britain January 25, 1929.

This invention relates to fluid pressure braking systems, more particularly for motor vehicles, of the kind comprising two separate systems each complete in itself and consisting of a pressure-producing unit or device adapted automatically to make up any loss of fluid in the system and communicating through a suitable fluid pressure pipe or system of pipes with pressure-operated means associated with the respective brakes to be applied, the two separate pressure-producing units or devices being actuated by a common lever or other operating member and the separate systems being rendered normally interdependent as regards the fluid pressure therein by means of a balancing device adapted to ensure equal pressures in the systems and that, further, should a defect occur in one of the systems to render the pressure fluid ineffective for applying the brakes, the other system will remain operative.

In the known system of the kind referred to, the pressure-producing pistons of the respective systems are connected to a double-armed lever pivoted centrally to the brake-operating member to ensure equalizing of the pressures in the two systems, and the angular movement of the lever about its pivotal axis is limited so that should one system fail the full pressure of the brake-operating member will remain effective on the other system.

The invention has for its object to provide an improved, simple and effective construction of balancing device.

According to the invention, the balancing device comprises a cylinder fitted with a single centrally arranged piston having an outwardly directed cup washer or other suitable packing at each end, the cylinder communicating at opposite ends with the separate systems and stops being provided for the purpose of limiting the axial movement of the piston in one direction or the other. It will be understood that in such a construction, on failure or breakage of one system, the piston would move into engagement with the respective stop and thereafter the pressure on the brake-operating member would be exerted solely upon the remaining system. Conveniently, the stops consist of integral inwardly extending projections upon screwed plugs or equivalent members closing the end of the cylinder.

The invention is hereinafter described by way of example with reference to the accompanying diagrammatic drawing, in which:—

Figure 1 is a diagrammatic plan view partly in section illustrating a fluid pressure braking system according to the invention; and Figure 2 is a detail cross-sectional view of the balancing device.

In carrying the invention into effect and in the application of the invention to a four-wheeled motor vehicle, each of the front brake drums 1 and of the rear brake drums 2 may be provided with a single pair of braking shoes 3, 4 respectively, or the equivalent adapted to be actuated respectively by a suitable pressure-operated device 5, 6 conveniently comprising an open-ended cylinder fitted with a pair of opposed pistons, as described in the prior specification No. 1,721,370. The pressure-operated devices of the brakes of one pair of wheels, for example the front pair 1, are connected to a fluid pressure pipe 7 or pipe system communicating with a suitable pressure-producing unit 8 or device advantageously of the kind described and claimed in the prior British specification No. 280,502. Similarly, the pressure-operated devices 6 of the other or rear pair of brakes 2 are connected to a separate fluid pressure pipe 9 or pipe system communicating with a separate pressure-producing unit 10 or device, the two pressure-producing units 8 and 10 or devices being arranged or adapted to be operated by a common brake lever 11 or equivalent member. At a suitable intermediate position in the fluid pressure pipes 7 and 9, a balancing or pressure-compensating device 12 is inserted. This device 12 consists of a hollow cylinder 13 closed at the ends by means of screwed plugs 14 or the like and provided adjacent each end with a pair of laterally extending bosses 15, 16 having screw-threaded holes communicating at their inner ends with the respective end of the cylinder 13 and adapted for connection with the respective pipe lines 7 and 9. A single piston 17, having at each end an outwardly directed cup washer 18 or other suitable packing, is provided in the cylinder 13 in an intermediate position and is capable of free movement therein within limits determined by fixed stops 19, 20 conveniently consisting of integral inwardly extending projections upon the screwed plugs 14 or closure members at the ends of the cylinder 13.

In the normal operation of the combined systems, movement of the brake lever 11 or equivalent member to apply the brakes will exert substantially the same pressure in each of the systems 7 and 9, any difference in pressure between the systems being equalized, and any variation of the displacement required in the pressure-producing devices 8, 10 to compensate for varying backlash or clearance between the shoes and the brake drums in the "off" position being taken up, by movement of the piston 17 of the balancing or pressure-compensating device 12 towards one end or the other of the cylinder 13. In the event of failure of one of the systems, the piston 17 in the balancing or pressure-compensating device will be forced over by the difference in pressure between the defective system and the system which is still operative until it engages with the respective fixed stop 19 or 20, whereupon the unaffected system will continue to function in the normal manner. It will be understood that when both systems are operating, the pressure applied to the brake lever 11 or the equivalent is divided substantially equally between the two systems 7, 9. When, however, one system fails, the whole of the pressure applied to the brake lever 11 or the like is communicated to the unaffected system with corresponding increase in the pressure with which the respective brakes are applied. For this reason it will be understood that the braking effect, neglecting the wheel slip will be substantially the same when one system only is operative as when both systems are operating correctly.

It will be understood that the invention is applicable to fluid pressure braking systems of the kind referred to wherein more than two separate systems are employed and wherein the systems are arranged otherwise than as hereinbefore described with reference to the drawing.

What we claim is:—

1. A fluid pressure braking means involving independent hydraulic systems, manual means for creating braking pressure in said systems, and a balancing device intermediate the systems and including a floating piston responsive only to the pressure of each system and serving to prevent fluid interchange between the systems, the movement of the piston in one direction under a limited excess pressure in one system serving in such movement to balance the pressures in the respective systems.

2. A fluid pressure braking means including independent hydraulic brake controlling systems, a balancing device for equalizing pressure between the systems including a floating piston responsive solely to an excess pressure in one of the systems and moving under such excess pressure to increase the pressure in the other system and reduce the pressure in the first mentioned system to a pressure balancing point, and means for limiting pressure responsive movement of the piston in either direction to prevent pressure exchange between the systems beyond a predetermined limit of pressure variation in the respective systems.

3. A fluid pressure braking means including independent brake controlling hydraulic systems, a pressure balancing means between the systems including a cylinder closed at the respective ends, a piston operative within the cylinder and normally defining chambers beyond each end of the piston, each pressure system including one of said chambers, the piston floating with respect to the chambers and solely responsive to variation in pressure in the chambers, said piston further preventing fluid exchange between the chambers, said piston under variation in pressure in one of the chambers and thereby in the system of which said chamber forms a part moving to reduce the normal volume of the other chamber to thereby increase the pressure in such other chamber and in the system in which said other chamber forms a part.

4. A fluid pressure braking means including independent brake controlling hydraulic systems, a pressure balancing means between the systems including a cylinder closed at the respective ends, a piston operative within the cylinder and normally defining chambers beyond each end of the piston, each pressure system including one of said chambers, the piston floating with respect to the chambers and solely responsive to variation in pressure in the chambers, said piston further preventing fluid exchange between the chambers, said piston under variation in pressure in one of the chambers and thereby in the system of which said chamber forms a part moving to reduce the normal volume of the other chamber to thereby increase the pressure in such other chamber and in the system in which said other chamber forms a part, and means for limiting pressure responsive movement of the piston in either direction.

5. A fluid pressure braking means including independent braking systems, an equalizing device arranged between the systems including a cylinder, plugs closing the respective ends of the cylinder, a piston floating in the cylinder and defining between each end thereof and the adjacent plug a chamber, each fluid pressure system including one of said chambers, the piston being normally balanced by the pressure of the fluid in the respective chambers and being influenced solely by an excess pressure in one of said chambers, to thereby increase the pressure in the other of such chambers and correspondingly reduce pressure in the first mentioned chamber to a balance, and projections from each of the cylinder closing plugs to limit movement of the piston in each direction, whereby a predominating pressure in one system in excess of a predetermined limit will operate the piston to its stop position to maintain the integrity of the excess pressure system without regard to pressure losses in the other system in excess of the limit for which the balancing device is set.

EDWARD BISHOP BOUGHTON.
  WILLIE EMMOTT.
  DENIS TABOR BROCK.